United States Patent
Ozeri et al.

(10) Patent No.: US 6,912,974 B2
(45) Date of Patent: Jul. 5, 2005

(54) APPARATUS FOR MOUNTING A PET SHELTER TO A PET DOOR PANEL IN A SLIDING GLASS DOOR ASSEMBLY

(76) Inventors: Moshe Ozeri, 23036 Burbank Blvd., Woodland Hills, CA (US) 91367; Reuben Bahar, 23708 Welby Way, West Hills, CA (US) 91307

( * ) Notice: Subject to any disclaimer, the term of this patent is extended or adjusted under 35 U.S.C. 154(b) by 5 days.

(21) Appl. No.: 10/405,324

(22) Filed: Apr. 2, 2003

(65) Prior Publication Data

US 2004/0194725 A1 Oct. 7, 2004

(51) Int. Cl.[7] .............................................. A01K 1/035
(52) U.S. Cl. ...................... 119/484; 119/501; 119/485
(58) Field of Search ................. 119/484, 501, 119/485, 452, 28.5; 49/404

(56) References Cited

U.S. PATENT DOCUMENTS

| | | | | |
|---|---|---|---|---|
| 3,738,322 A | * | 6/1973 | Smith | 119/484 |
| 4,291,645 A | * | 9/1981 | Cruchelow et al. | 119/484 |
| 4,445,459 A | * | 5/1984 | Julie | 119/28.5 |
| 4,788,934 A | * | 12/1988 | Fetter | 119/484 |
| 4,989,546 A | * | 2/1991 | Cannaday | 119/484 |
| D317,216 S | * | 5/1991 | Cutrone | D30/109 |
| 5,165,366 A | * | 11/1992 | Harvey | 119/165 |
| 5,261,350 A | * | 11/1993 | Vavrek | 119/484 |
| 5,522,344 A | * | 6/1996 | Demurjian | 119/474 |
| 5,649,500 A | * | 7/1997 | Klavemann et al. | 119/452 |
| 5,890,455 A | * | 4/1999 | Donchey | 119/484 |
| 6,029,609 A | | 2/2000 | Bahar et al. | 119/474 |

\* cited by examiner

Primary Examiner—Yvonne R. Abbott

(57) ABSTRACT

An apparatus for mounting a pet shelter to a pet door panel in a sliding glass door assembly. The apparatus has both left and right side posts which sandwich a pet door panel. A retaining frame is attached to either or both posts and is capable of retaining the pet shelter. The retaining frame has cross members that allow the pet shelter to be attached in a folded down configuration and further has a shelter support element for holding the pet shelter in a folded up configuration. A hinge may be attached between the retaining frame and either post for allowing the pet shelter to be tilted out of the way when not in use.

28 Claims, 7 Drawing Sheets

APPARATUS FOR MOUNTING A PET SHELTER TO A PET DOOR PANEL IN A SLIDING GLASS DOOR ASSEMBLY

BACKGROUND OF THE INVENTION

The field of the invention is mounting brackets and the invention relates more particularly to a apparatus bracket for use with a pet door panel which is attachable to a sliding glass door assembly.

Pet door panels (also known as "pet patio doors") have provided pet owners with a device for allowing their pets to enter and exit a dwelling via passage through a sliding glass door assembly. A sliding glass door assembly usually consists of a track mounted glass door which is able to open and close by sliding to and away from a door frame edge. A pet door panel, on the other hand, typically consists of a rectangular formation having a pet door opening in its lower portion. The pet door panel is sandwiched between the door frame edge of a dwelling and a sliding glass door.

Although pet door panels allow pets to enter and exit the dwelling, they are unable to restrict a pet's movement inside or outside of the dwelling as would an animal crate. This is problematic as it is often preferred to allow a pet to have shared, yet restricted access between the indoor and outdoor premises of the dwelling. One such device that allows for this is a foldable pet shelter as described in U.S. Pat. No. 6,029,609, which is incorporated by reference herein. The Foldable Pet Shelter has a top panel, right side panel, left side panel, and end panel that can be hingedly affixed to a surface of an exterior panel of a dwelling. Due to the typical structure of pet door panels, an apparatus for attaching such pet shelters to the pet door panel is required.

BRIEF SUMMARY OF THE INVENTION

The present invention is for an apparatus for mounting a pet shelter to a pet door panel in a sliding glass door assembly. The apparatus has a left and right post which sandwich a pet door panel that is installed within the sliding glass door assembly. A retaining frame is attached to one of the posts and is capable of holding a pet shelter in either a folded down or folded up configuration. A hinge may be affixed between the retaining frame and either the left or right post for allowing the pet shelter to be tilted out of the way when not in use. In this manner, a pet shelter may be utilized in conjunction with a pet door panel for allowing a pet restricted access to the inside or outside of a dwelling.

DETAILED DESCRIPTION OF THE PREFERRED EMBODIMENTS

Figure 1:
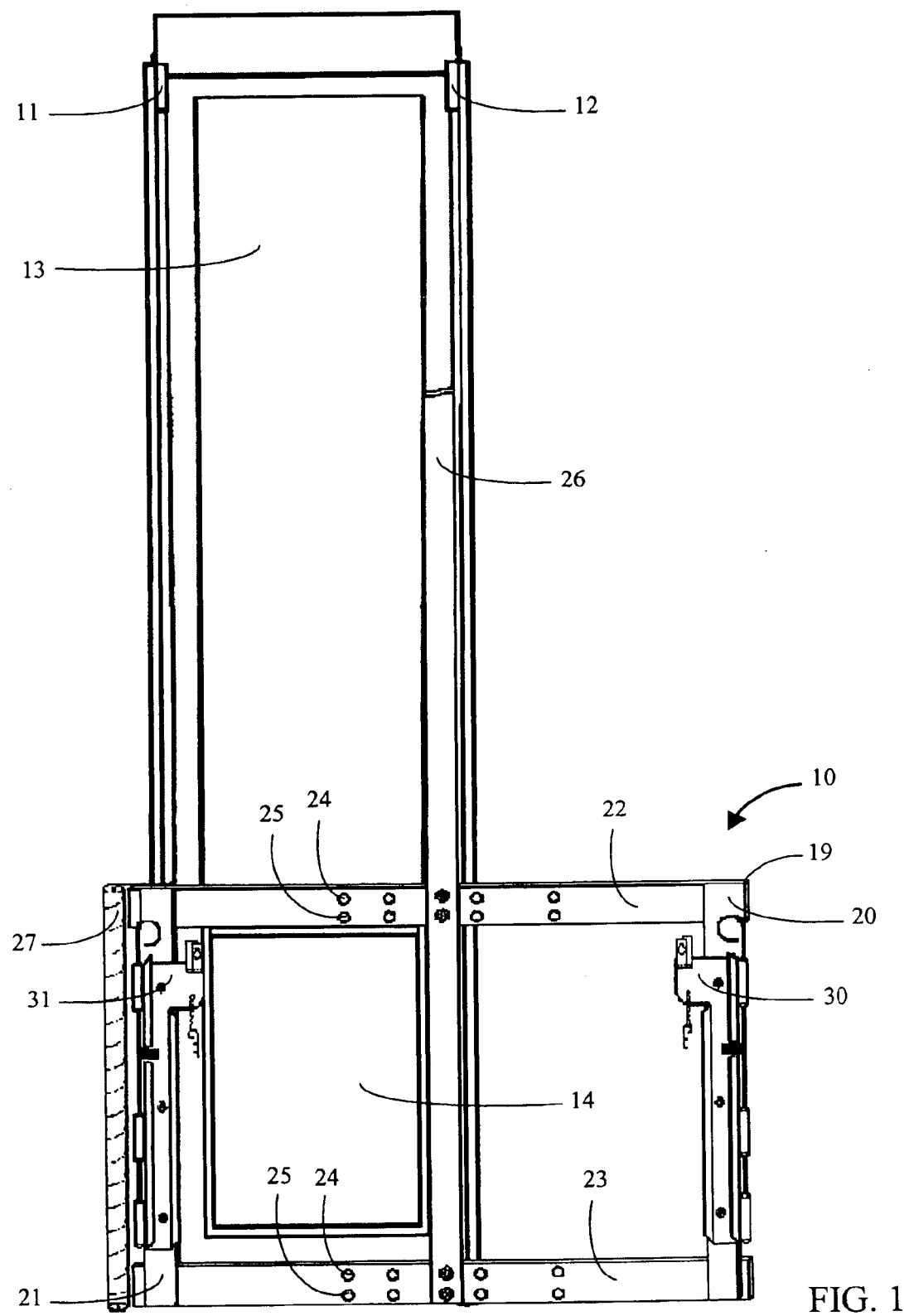
FIG. 1 is a perspective view of the apparatus of this present invention attached to a pet door panel.

An apparatus for attaching a pet shelter to a sliding glass door assembly is shown in FIG. 1 and is denoted generally by character reference 10. Apparatus 10 has a left post 11 and right post 12. Left post 11 and right post 12 sandwich a pet door panel 13 and are preferably affixed to the pet door panel 13 with affixing element(s) such as clips or screws. A retaining frame 19 is attached to post 11 and is capable of retaining a pet shelter. It is notable that post 11, 12, and retaining frame 19 of apparatus 10 are made out of a rigid material such as metal, plastic, or the like, and are preferably made out of aluminum. Additionally, retaining frame 19 may undertake any conceivable geometric formation, including, but not limited to rectangular, triangular, trapezoidal, circular, elliptical, etc.

Figure 3:
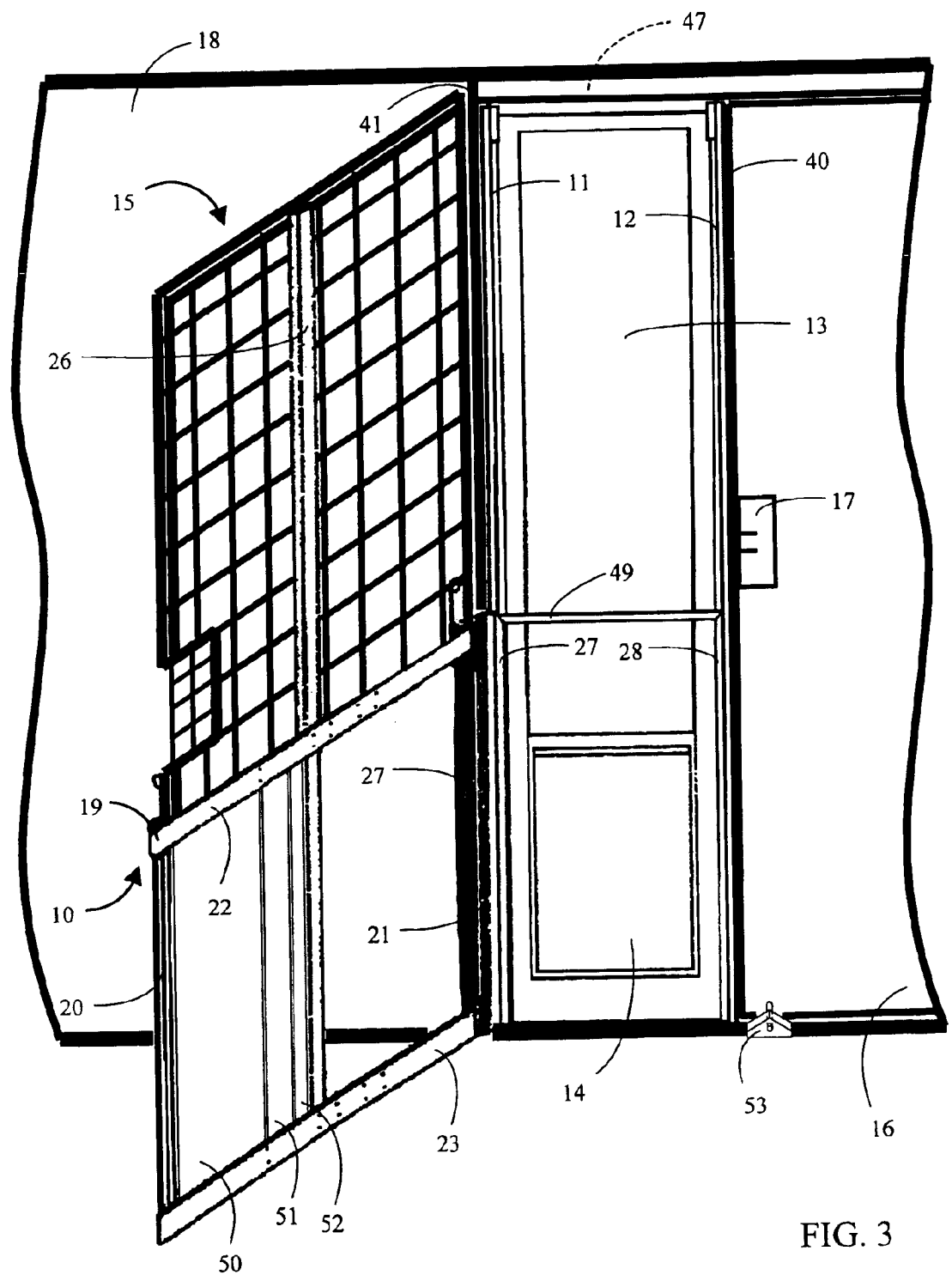
FIG. 3 is a perspective view of the apparatus of FIG. 1, wherein the pet shelter is shown in a folded up configuration and tilted along a hinged axis for positioning it out of the way.

As illustrated in FIG. 1, retaining frame 19 is composed of four cross members which border a pet door opening 14 and is preferably arranged in a rectangular formation. The upper portion of both right and left vertical cross members 20 and 21, respectively, are each attached to an opposite side end of upper horizontal cross member 22, while the lower portion of both right and left cross members 20 and 21, respectively, are each attached to an opposite side end of lower horizontal cross member 23. Both upper 22 and lower 23 horizontal cross members each contain five sets of screw mounts, each set consisting of two mounts 24 and 25 respectively, which are positioned above and below one another. These screw mount sets provide a structure for mounting a shelter support element 26 to the retaining frame 19. The shelter support element 26 allows a pet shelter to be supported by the apparatus 10 in an upright folded configuration (ref. FIG. 3). As illustrated in this invention, shelter support element 26 may be an elongated vertical member having a height that is sufficient for supporting the shelter in the stated configuration. In this respect, supporting element 26 acts as a back column to which the shelter can be removably attached to with use of a locking element such as a snap clip or chain. Of course, it is obvious that other methods and/or configuration(s) for holding a pet shelter in an upright folded configuration may likewise exist which are best known to those skilled in the art and therefore, need not be mentioned herein.

Returning to FIG. 1, the screw mount sets in the upper cross member 22 line up in the same vertical axis as the screw mount sets of the lower cross member 23. The shelter support element 26 is attached to the retaining frame 19 from screw mount sets laying in the same vertical axis. The positioning of each of the screw mount sets along the length of each of the upper 22 and lower 23 cross members is determined according to the width of the pet door panel 13 pet door opening 14. For example, as shown in FIG. 1, the shelter support element 26 is attached to the third screw mount sets (as per screw mounts 24 and 25 respectively), of the upper 22 and lower 23 horizontal cross members. This allows the apparatus 10 to be adjusted to the size of the pet door panel 13 so that the pet door opening 14 is unobstructed by shelter support element 26. Since pet door panels come in different widths, allowing the mounting position of the shelter support element 26 to be adjusted is pertinent.

The retaining frame 19 also provides a surface for attaching mounting brackets 30 and 31 to which the pet shelter is secured. As further seen in FIG. 1, pet shelter mounting brackets 30 and 31 are each attached to vertical cross members 20 and 21 respectively. Although not shown, it is contemplated that the functions of pet shelter mounting brackets 30 and 31 may be built into cross members 20 and 21, thereby eliminating the need to attach brackets 30 and 31. Additionally, it is further contemplated that the retaining frame 19 may even be hingedly affixed directly to the pet door, without the use of posts 11 and 12.

Figure 2:
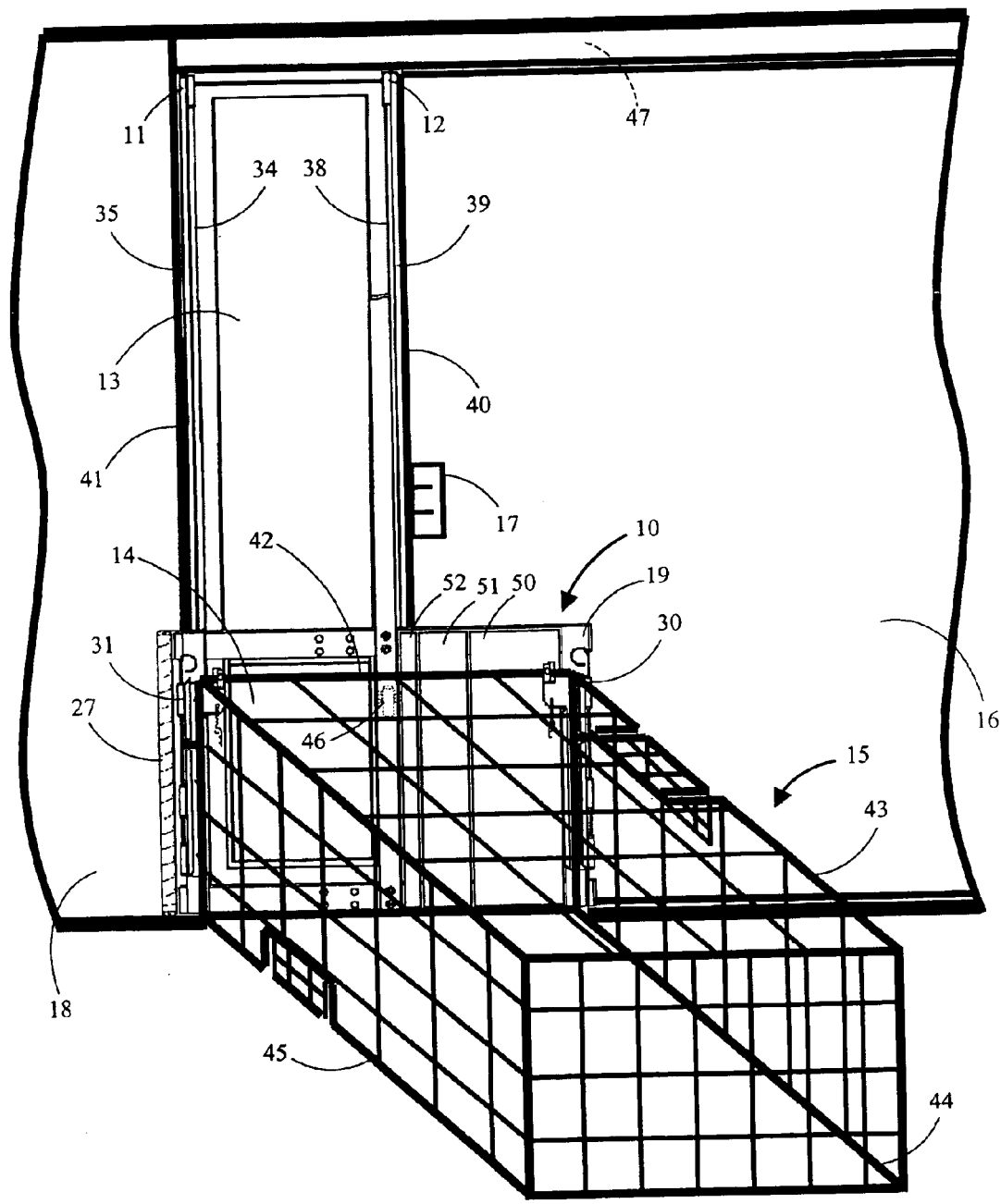
FIG. 2 is a perspective view of the apparatus of FIG. 1 retaining a pet shelter in the folded down position.
Figure 4:
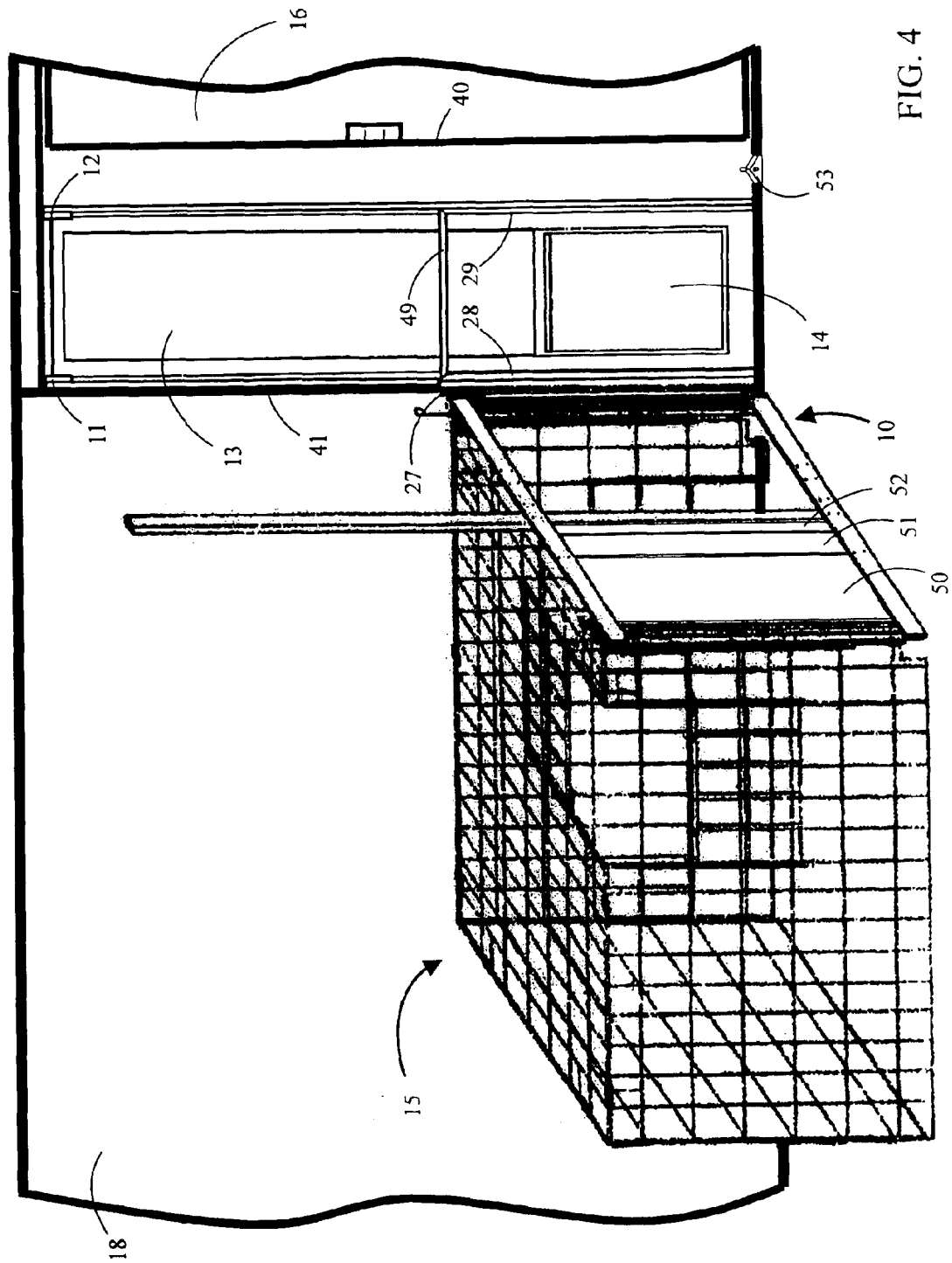
FIG. 4 is a perspective view of the apparatus of FIG. 1, wherein the pet shelter is shown in a folded down configuration and tilted along a hinged axis for positioning it out of the way.

It is noteworthy that while retaining frame 19 is shown as being attached to post 11 from the end closest to vertical cross member 21, it may alternatively be attached to post 12 from the end closest to vertical cross member 20. The preferable positioning would depend on the configuration of the sliding glass door assembly. For example, if the sliding glass door assembly has a glass door that opens to the right (as is shown in FIGS. 2, 3, and 4), then it would be preferred to have retaining frame 19 attached to post 11 as noted above. If, on the other hand, the glass door is opened to the left (not shown), then attachment to post 12, as mentioned above would be preferred. It should further be mentioned that although it is preferred that retaining frame 19 be hingedly attached to either post 11 or 12 via hinge 27, it need not be so, and may alternatively be unhingeldly affixed.

Referring now to FIG. 2, a pet shelter 15 is shown attached to the retaining frame 19 of apparatus 10 and configured in the folded down position inside of a dwelling. The apparatus 10 is sandwiched between the door frame edge 41 of the dwelling wall 18 and a sliding glass door 16. As illustrated, the inner lateral end 34 of post 11 abuts the left side of pet door panel 13, while the outer lateral end 35 of post 11 abuts the door frame edge 41. Similarly, on the opposite side, the inner lateral edge 38 of post 12 abuts the right side of pet door panel 13, while the outer lateral end 39 abuts the edge 40 of the sliding glass door 16. The post abutting the door frame edge 41 is preferably affixed to the edge 41 so as to secure apparatus 10 in a fixed position within the sliding glass door assembly. Additionally, a locking element used with either the sliding glass door assembly, sliding glass door 16, post nearest the sliding glass door 16, or a combination of these, may allow the sliding glass door 16 to be placed in a locked "closed door" position. The locking element may comprise a pin latch mechanism 53, as shown in FIGS. 3 and 4, or any other type of locking device which is best known to those skilled in the art. The locking element, such as pin latch 53, can be adapted to secure the sliding glass door 16 to the sliding glass door assembly or one of the posts (e.g. post 12).

Figure 8:
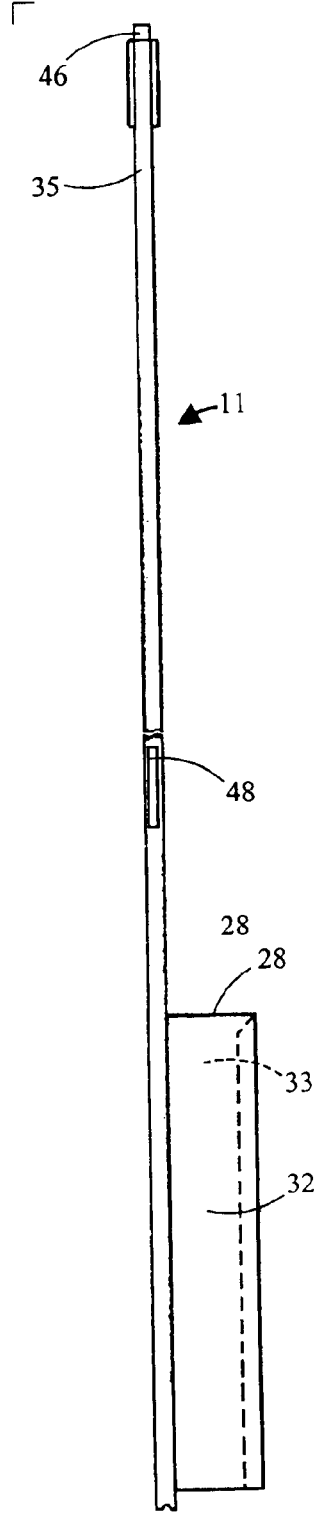
FIG. 8 is a right side view of the left side post of the apparatus.
Figure 11:
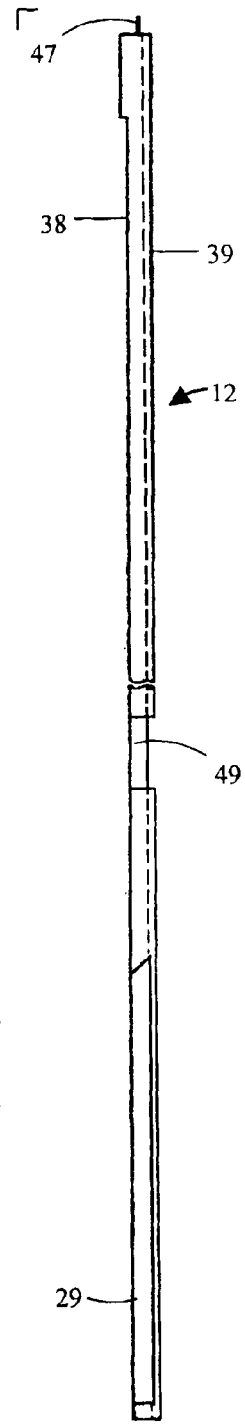
FIG. 11 is a front side view of the right side post of the apparatus.
Figure 12:
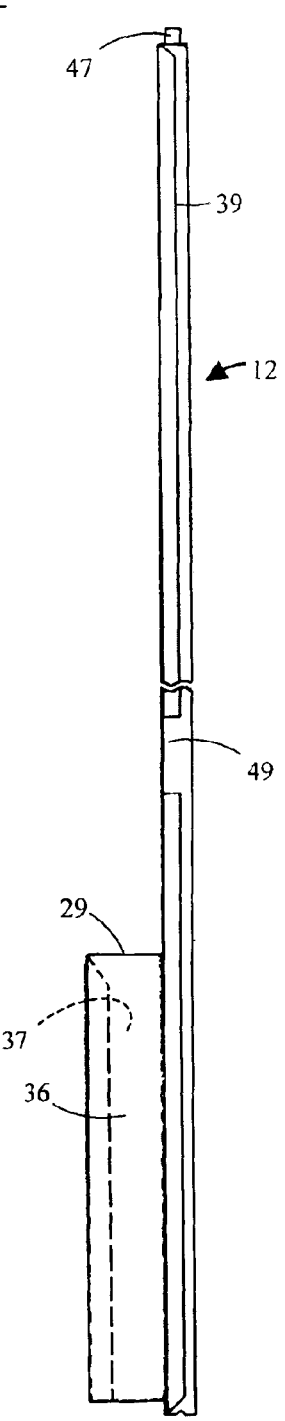
FIG. 12 is a left side view of the right side post of the apparatus.

It is further preferred that the post which abuts the door frame edge 41 (illustrated as left post 11) have a notched area formation 48 on its outer lateral end 35. As shown in FIG. 8, the notch 48 is rectangular, but may alternatively undertake any other geometrical shape. Notch 48 will conceal any protruding part of the locking element (male and/or female components) of the sliding glass door assembly so that the post's outer lateral end 35 can be fitted to the door frame edge 41 in a flush manner. Similarly, it is preferred that the post which abuts the sliding glass door 16 (illustrated as right post 12) also have a notched area formation 49 on its outer lateral end 39. As shown in FIGS. 11 and 12, the notch 49 is placed on the left side portion of outer lateral end 39. The notch 49 will curb around the housing of the sliding glass door handle 17, thereby allowing the sliding glass door 16 to fit into outer lateral end 39 in a flush manner.

With reference to FIG. 2, it is notable that the shelter 15 is secured to retaining frame 10 via attachment to brackets 30 and 31. Here, the back end 42 of the shelter's 15 top panel 43 as well as right side panel 44 and left side panel 45 are held by the brackets 30 and 31, respectively. As such, a pet may come from the outdoors into the dwelling through the pet door 14, yet still remain within the confines of the shelter 15. Although not shown, the apparatus 10 may likewise be mounted in a reverse manner which allows the pet shelter 15 to be placed outdoors. Here, a pet may exit the indoor premises to go outdoors through the pet door 14, yet still remain within the confines of the shelter 15. Use in this manner would result in the pet being restrained to an area outside of the dwelling that lays within the confines of the shelter 15 upon their exit outdoors. It is noteworthy that where the retaining frame 19 is hingedly 27 attached to either of the left 11 or right 12 posts, a locking element 46 is preferably provided for preventing the frame 19 from freely rotating about the vertical axis of the hinge 27 (as shown in FIG. 2). Locking element 46 may be any type of locking device such as a snap clip, spring loaded, lock and eye, or similar type mechanism and is preferably mounted in-between the post farthest from the hinge 27 and at least one point of contact on or near retaining frame 19.

One of the notable features made possible by attaching a hinge 27 between one of the posts 11 or 12 and retaining frame 19, is the ability to tilt the shelter 15 out of the way when it is not in use. As shown in FIG. 3, the shelter is held in a folded up configuration with the retaining frame 19 being tilted to the left along the vertical axis of hinge 27. Similarly, the shelter 15 may be tilted to the left along the hinged axis while remaining in the folded down configuration, as shown in FIG. 4. Preferably, the hinge 27 allows the retaining frame 19 to be tilted to a position where it is rendered parallel with the dwelling wall 18, or as far close to that as possible. A locking mechanism (not shown) capable of gripping the retaining frame 19, pet shelter 15, or both, may be attached to the wall 18 for securing the retaining frame 19 in the stated parallel position. Allowing the retaining frame 19 to be tilted in such a manner is advantageous in several respects. First, it provides for a convenient storage solution for the shelter 15 when it is not in use. Second, it preventing the shelter 15 from obstructing the passageway of the sliding glass door 16 during times that the door 16 is opened.

In order to provide clearance room for the shelter 15 to be tilted to a position parallel to the wall 18, use of an extension element such as extension plates 28 and 29 (FIGS. 3 and 4) may be required. Extension plates 28 and 29 are each sandwiched between the pet door panel 13 and the retaining frame 19, thereby distancing the two from each other. A top panel 49 may further stretch from the ends of extension plates 28 and 29. This would prevent a pet from escaping the shelter 15 through the top portion in-between extension plates 28 and 29. It is further noteworthy that a barrier element such as panels 50, 51, and 52 may be attached or built-in to retaining frame 19. This would provide a method of closing openings in the frame 19 that provide a pet with an exit out of the shelter 15 when placed in the folded down configuration. The barrier element may be panels (as shown), grid wire, or any other appropriate element.

Figure 5:
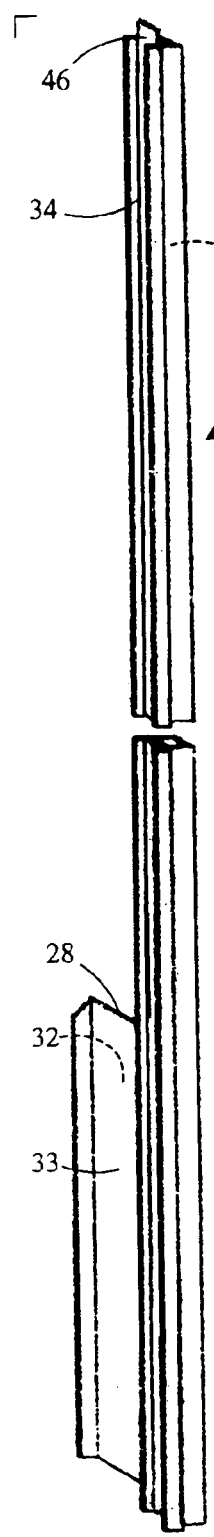
FIG. 5 is an isometric view of the left side post of the apparatus.
Figure 6:
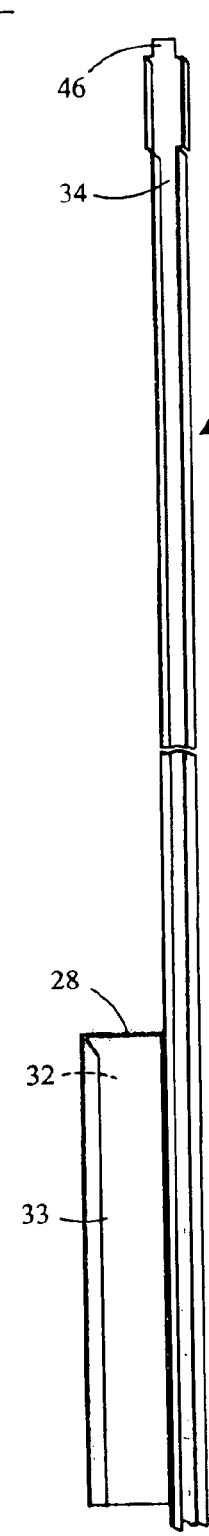
FIG. 6 is a left side view of the left side post of the apparatus.
Figure 7:
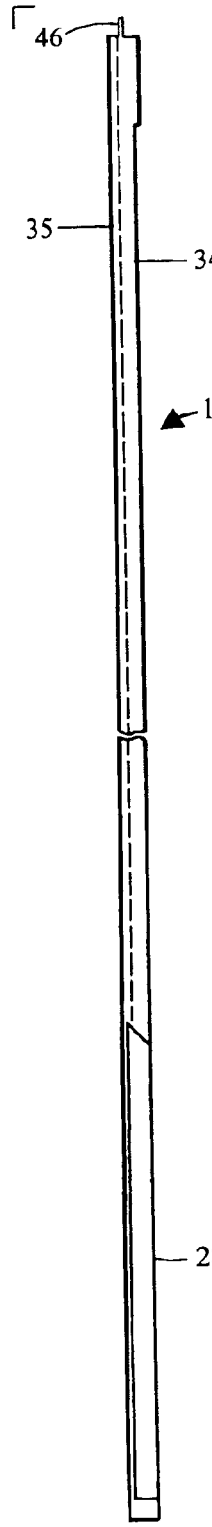
FIG. 7 is a front side view of the left side post of the apparatus.

The left post 11 is shown in isometric view in FIG. 5. Post 11 is an elongated member having inner lateral end 34 which is rendered in a convex "U" formation for allowing it to fit around the perimeter edges of the left end portion of the pet door panel 13. Outer lateral end 35 is further shown as having a flush formation which would allow it to be fitted into the convex "U" perimeter of the door frame edge 41. Tongue 46 is located on the top portion of post 11 for providing an element for stabilizing the insertion of post 11 into the upper housing 47 of the sliding glass door assembly (FIG. 2). An extension plate 28 having outer 32 and inner 33 sides is further shown in FIG. 5 as attached to post 11. As previously mentioned, extension plate 28 provides an element for extending the distance between the pet door panel 13 and retaining frame 19. Various other views of post 11 are shown in FIGS. 6, 7, and 8, which illustrate the post 11 from a left, front, and right view respectively. With regards to FIG. 8, notched area formation 48, (which is shown on the outer lateral end 35 of the post 11) provides a structure for concealing any protruding portion(s) of the sliding glass door locking element that lay within the door frame edge 41. This will allow for the outer lateral end of post 11 to be fitted inside the door frame edge 41 in an abuttingly flush manner.

Figure 9:
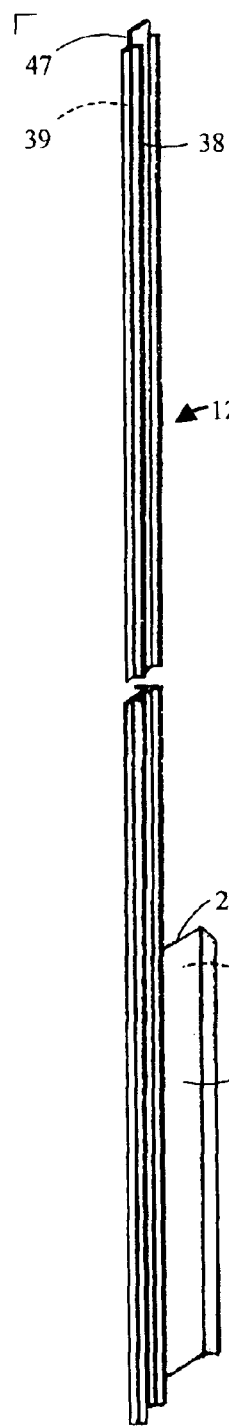
FIG. 9 is an isometric view of the right side post of the apparatus.
Figure 10:
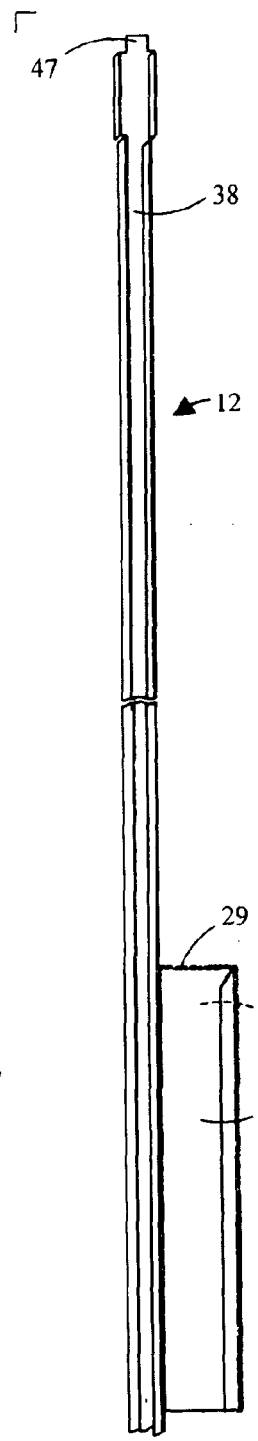
FIG. 10 is a right side view of the right side post of the apparatus.

Similar to post 11, the right post 12 is shown in isometric view in FIG. 9. Post 12 is an elongated member having inner lateral end 38 which is rendered in a convex "U" formation for allowing it to fit around the perimeter edges of the right end portion of the pet door panel 13. Outer lateral end 39 is further shown as being "L" shaped. This formation allows end 39 to fit around the perimeter edges of the sliding glass door 16, regardless of the thickness of the door 16. Of course, outer lateral end 39 may alternatively be flat, whereby it would abut the flat edge 40 of the sliding glass door 16 (FIG. 2). Tongue 46 is located on the top portion of post 12 for providing an element for stabilizing the insertion of post 12 into the upper housing 47 of the sliding glass door assembly (FIG. 2). An extension plate 29 having outer 36 and inner 37 sides is further shown in FIG. 9 as attached to post 12. Various other views of post 12 are shown in FIGS. 10, 11, and 12, which illustrate the post 12 from a right, front, and left view respectively. With regards to FIGS. 11 and 12, notched area formation 49, which is shown on the side portion of outer lateral end 39 provides a structure for circumventing any protruding portion(s) of the sliding glass door handle 17 when the sliding glass door 16 is positioned in an abutting manner to outer lateral end 39.

Figure 13:
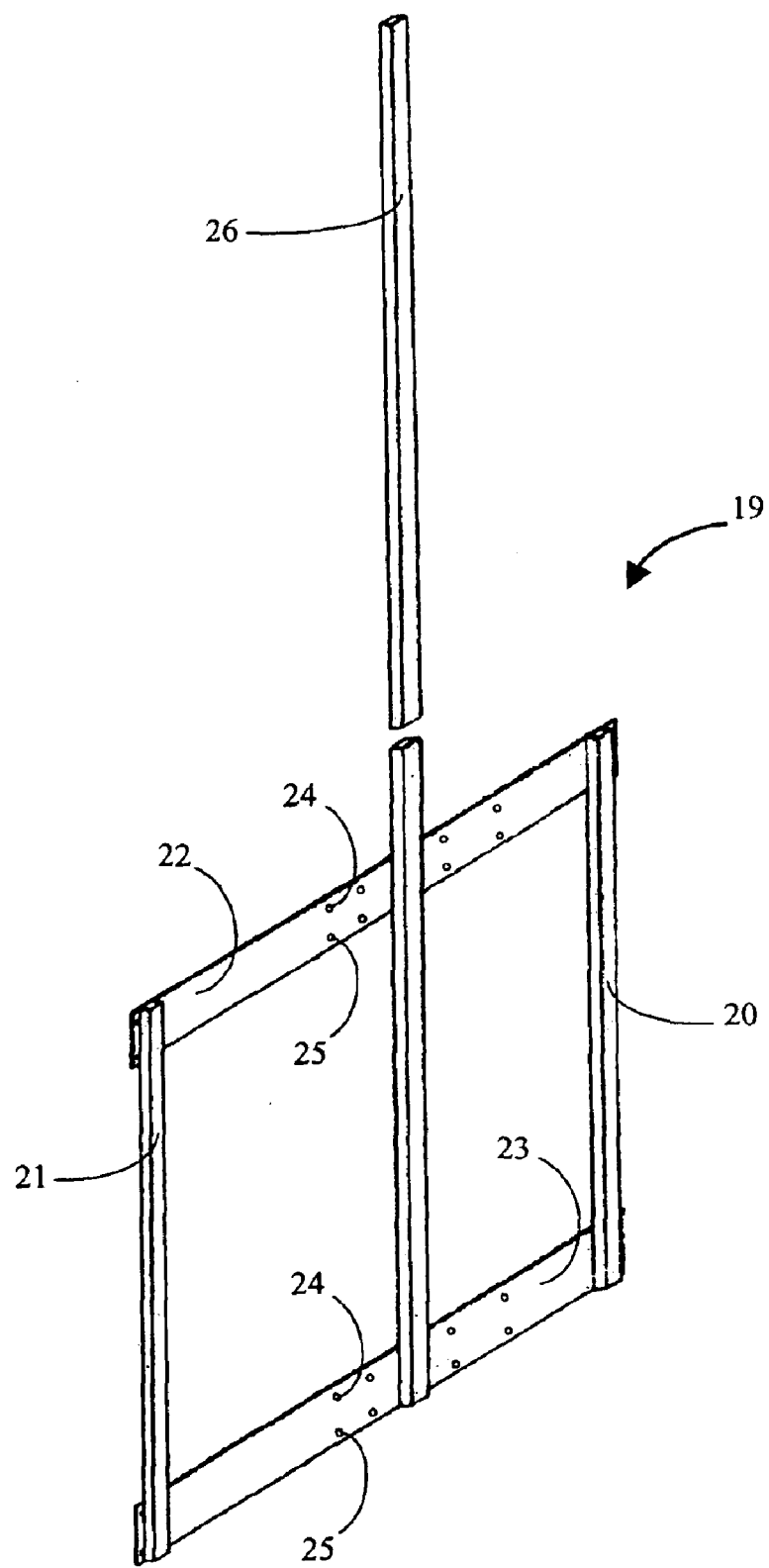
FIG. 13 is a plan view of the retaining frame of the apparatus.

Referring to FIG. 13, the retaining frame 19 is shown in plan view and configured in a rectangular formation. Retaining frame 19 has vertical right and left cross members 20 and 21 respectively, and horizontal upper and lower cross members 22 and 23 respectively. Five sets of screw mounts, each having upper 24 and lower 25 mounts are further shown with a shelter support element 26 attached to the third screw mount set of horizontal cross members 22 and 23. Although five screw mount sets are shown, more or less mounts may be placed on the retaining frame 19, as is required.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

We claim:

1. An apparatus for attaching a pet shelter to a pet door panel, said apparatus comprising:
   a left post attachable to the left side of a pet door panel, said left post positioned in a sliding glass door assembly in-between a door frame edge and said left side of said pet door panel;
   a right post attachable to the right side of said pet door panel, said right post positioned in a sliding glass door assembly in-between a sliding glass door and said right side of said pet door panel;
   a retaining frame attachable to the left post, right post, or a combination thereof, said retaining frame capable of holding a pet shelter, shelter mounting brackets, or a combination thereof.

2. The apparatus of claim 1, wherein said retaining frame is hingedly attached to said left post or said right post.

3. The apparatus of claim 2, further including a locking element which secures said retaining frame to said left post, right post, or a combination thereof, for preventing said retaining frame from freely rotating about the vertical axis of said hinge.

4. The apparatus of claim 2, further including an element for securing said retaining frame, said pet shelter, or a combination thereof, to a wall of a dwelling when said retaining frame is tilted about its vertical axis.

5. The apparatus of claim 1, further including a pet shelter support element which supports said pet shelter in an upright folded configuration.

6. The apparatus of claim 5, further including a locking element for securing said pet shelter to said support element.

7. The apparatus of claim 1, wherein said left post, right post, or a combination thereof, include an extension element which distances said retaining frame away from said pet door panel.

8. The apparatus of claim 1, further including a barrier element attachable to said retaining frame which prevents a pet from exiting the confines of said pet shelter through an opening other then that of said pet door panel.

9. The apparatus of claim 1, wherein said left post, right post, or a combination thereof, includes a notched area formation which allows said apparatus to be fitted flush within said sliding glass door assembly.

10. The apparatus of claim 1, further including a locking element attachable to said sliding glass door, said sliding glass door assembly, said left post, said right post, or a combination thereof, for securing said sliding glass door in a locked closed door position.

11. An apparatus for attaching a pet shelter to a pet door panel, said apparatus comprising:
    a retaining frame attached to a pet door panel which is positioned in a sliding glass door assembly in-between a sliding glass door and a door frame edge, said retaining frame mounted to a surface area of said pet door panel and positioned in-between said pet door panel and a pet shelter wherein said retaining frame is capable of holding said pet shelter,
    said pet shelter consisting essentially of a top panel, right side panel, left side panel, an end panel, and attachment elements which connect the panels together to form said shelter.

12. The apparatus of claim 11, wherein said retaining frame is hingedly attached to said pet door panel.

13. The apparatus of claim 12, further including a locking element which secures said retaining frame to said pet door panel for preventing said retaining frame from freely rotating about the axis of said hinge.

14. The apparatus of claim 12, further including an element for securing said retaining frame, said pet shelter, or a combination thereof, to a wall of a dwelling when said retaining frame is tilted about its vertical axis.

15. The apparatus of claim 11, further including a pet shelter support element which supports said pet shelter in an upright folded configuration.

16. The apparatus of claim 15, further including a locking element for securing said pet shelter to said support element.

17. The apparatus of claim 11, wherein said pet door panel includes an extension element which distances said retaining frame away from said pet door panel.

18. The apparatus of claim 11, further including a barrier element attachable to said retaining frame which prevents a pet from exiting the confines of said pet shelter through an opening other than that of said pet door panel.

19. The apparatus of claim 11, further including a locking element attachable to said sliding glass door, said sliding glass door assembly or a combination thereof, for securing said sliding glass door in a locked closed door position.

20. The apparatus of claim 11 wherein said shelter is connected to said retaining frame via mounting brackets.

21. An apparatus for attaching a pet shelter to a pet door panel, said apparatus comprising:
   a right post attachable to the right side of a pet door panel, said right post positioned in a sliding glass door assembly in-between a door frame edge and said right side of said pet door panel;
   a left post attachable to the left side of said pet door panel, said left post positioned in a sliding glass door assembly in-between a sliding glass door and said left side of said pet door panel;
   a retaining frame attachable to the right post, left post, or a combination thereof, said retaining frame capable of holding a pet shelter, shelter mounting brackets, or a combination thereof.

22. An apparatus for attaching a pet shelter to a pet door panel, said apparatus comprising:
   a retaining frame attached to a pet door panel which is positioned in a sliding glass door assembly in-between a sliding glass door and a door frame edge, said retaining frame mounted to a surface area of said pet door panel and positioned in-between said pet door panel and a pet shelter wherein said retaining frame is capable of holding said pet shelter, said pet shelter being foldable.

23. The apparatus of claim 22, wherein said shelter is connected to said retaining frame via mounting brackets.

24. The apparatus of claim 22, wherein said retaining frame is hingedly attached to said pet door panel.

25. The apparatus of claim 22, wherein said pet door panel includes an extension element which distances said retaining frame away from said pet door panel.

26. The apparatus of claim 22, further including a pet shelter support element which supports said pet shelter in an upright folded configuration.

27. The apparatus of claim 22, further including a barrier element attachable to said retaining frame which prevents a pet from exiting the confines of said pet shelter through an opening other than that of said pet door panel.

28. A method of attaching a pet shelter to a pet door panel, said method comprising:
   a) providing a retaining frame adapted for attachment to said pet door panel, said pet door panel being positioned in a sliding glass door assembly in-between a sliding glass door and a door frame edge;
   b) positioning said retaining frame in-between said pet door panel and said pet shelter;
   c) attaching said retaining frame to said pet door panel wherein said retaining frame is capable of holding said pet shelter.

* * * * *